US012068526B2

(12) United States Patent
Lee

(10) Patent No.: US 12,068,526 B2
(45) Date of Patent: Aug. 20, 2024

(54) ANTENNA DEVICE

(71) Applicant: Tyco Electronics AMP Korea Co., Ltd., Jillyang-Eup Gyeongsan (KR)

(72) Inventor: Chang Hyun Lee, Suwon (KR)

(73) Assignee: TYCO ELECTRONICS AMP KOREA CO., LTD., Jillyang-Eup Gyeongsan (KR)

(*) Notice: Subject to any disclaimer, the term of this patent is extended or adjusted under 35 U.S.C. 154(b) by 5 days.

(21) Appl. No.: 17/471,284

(22) Filed: Sep. 10, 2021

(65) Prior Publication Data

US 2022/0085486 A1 Mar. 17, 2022

(30) Foreign Application Priority Data

Sep. 15, 2020 (KR) ........................ 10-2020-0118440

(51) Int. Cl.
*H01Q 1/22* (2006.01)
*H01Q 1/48* (2006.01)
*H01Q 5/35* (2015.01)
*H01Q 21/26* (2006.01)

(52) U.S. Cl.
CPC ............. *H01Q 1/2291* (2013.01); *H01Q 1/48* (2013.01); *H01Q 5/35* (2015.01); *H01Q 21/26* (2013.01)

(58) Field of Classification Search
CPC ............................... H01Q 1/2291; H01Q 1/22
See application file for complete search history.

(56) References Cited

U.S. PATENT DOCUMENTS 6,344,833 B1 2/2002 Lin et al.
8,994,603 B2 * 3/2015 Harel ..................... H01Q 21/26 343/797
9,496,614 B2 * 11/2016 Bringuier ............... H01Q 21/30
2003/0011529 A1 1/2003 Gottl
2008/0094282 A1 4/2008 Qin
2011/0032165 A1 * 2/2011 Heng ....................... H01Q 9/06 343/745
2012/0280880 A1 11/2012 Arvidsson et al.
2015/0035719 A1 * 2/2015 Chieh .................... H01Q 21/28 343/848

(Continued)

FOREIGN PATENT DOCUMENTS

EP 2533359 A1 * 12/2012 ............. H01Q 1/241
KR 20020073212 A 9/2002

(Continued)

OTHER PUBLICATIONS

Office Action for corresponding CN Application No. 202111061663.0 dated Jun. 26, 2023 (9 pages).

(Continued)

*Primary Examiner* — Hoang V Nguyen
*Assistant Examiner* — Brandon Sean Woods
(74) *Attorney, Agent, or Firm* — Jay J. Hoette; The Small Patent Law Group, LLC

(57) ABSTRACT

An antenna device includes a plurality of first antennas for communication in a first frequency band, a first ground plane configured to provide a ground voltage to the first antennas, a plurality of second antennas for communication in a second frequency band, and a second ground plane configured to provide a ground voltage to the second antennas, and the first ground plane and the second ground plane are electrically isolated from each other.

11 Claims, 20 Drawing Sheets

800

(56) References Cited

U.S. PATENT DOCUMENTS

| | | | | |
|---|---|---|---|---|
| 2017/0141473 | A1* | 5/2017 | Sharawi | H01Q 5/321 |
| 2017/0179610 | A1* | 6/2017 | Watson | H01Q 1/48 |
| 2018/0269577 | A1* | 9/2018 | Kosaka | H01Q 15/0013 |
| 2019/0089419 | A1 | 3/2019 | Kim et al. | |
| 2019/0103656 | A1* | 4/2019 | Shi | G06F 1/1683 |
| 2020/0028276 | A1* | 1/2020 | Watson | H01Q 9/145 |
| 2021/0305718 | A1* | 9/2021 | Li | H01Q 21/062 |
| 2021/0320406 | A1* | 10/2021 | Chen | H01Q 21/062 |
| 2021/0328334 | A1* | 10/2021 | Cooper | H01Q 1/526 |
| 2023/0216205 | A1* | 7/2023 | Li | H01Q 19/108<br>343/835 |

FOREIGN PATENT DOCUMENTS

| | | | |
|---|---|---|---|
| KR | 20120086838 | A | 8/2012 |
| KR | 20180025066 | A | 3/2018 |
| WO | 2012102576 | A2 | 8/2012 |

OTHER PUBLICATIONS

Second Office Action for corresponding CN Application No. 202111061663.0 dated Nov. 8, 2023 (9 pages).
Third Office Action for corresponding CN Application No. 202111061663.0 dated Apr. 27, 2024 (6 pages).
Office Action for corresponding KR Application No. 1020200118440 dated Apr. 29, 2024 (4 pages).

* cited by examiner

ANTENNA DEVICE

CROSS REFERENCE TO RELATED APPLICATIONS

This application claims priority to KR Application No. 10-2020-0118440, filed 2020 Sep. 15, the subject matter of which is herein incorporated by reference in its entirety.

BACKGROUND OF THE INVENTION

The subject matter herein relates generally to an antenna device.

An antenna refers to a part formed using a conductor that transmits electric waves to another location or receives electric waves from the location to perform wireless communication and may be applied to a variety of products, for example, a wireless telegraph, a wireless phone, a radio, a television, and the like. An antenna module includes a substrate and at least one antenna installed on the substrate. In general, the antenna is manufactured in a specific form suitable for the purpose and shape of a product.

Korean Patent Registration No. 10-0794788 discloses a multiple input multiple output (MIMO) antenna as an example of an antenna module. The antenna module is associated with the MIMO antenna and is designed to operate in a multi-frequency band and to have a miniaturized size.

Recently, according to the demand for a high-quality multimedia service using wireless mobile communication technology, next-generation wireless transmission technology for transmitting a larger quantity of data faster with a lower error probability is being required. Accordingly, the MIMO antenna is proposed. The MIMO antenna performs a MIMO operation by arranging a plurality of antenna devices in a specific structure. The MIMO antenna is configured to form the entire radiation pattern in a sharp shape and to transmit electromagnetic waves to a further location by merging the radiation power and the radiation pattern of a plurality of antenna devices.

Accordingly, it is possible to enhance a data transmission rate within a specific range or to increase a system range with respect to a specific data transmission rate. The MIMO antenna is next-generation mobile communication technology widely available for mobile communication terminals, repeaters, and the like, and has been gaining interest as next-generation technology beyond a transmission amount limit of mobile communication close to a critical situation due to a data communication expansion, and the like.

BRIEF DESCRIPTION OF THE INVENTION

According to an example embodiment, there is provided an antenna device including a plurality of first antennas for communication in a first frequency band, a first ground plane configured to provide a ground voltage to the first antennas, a plurality of second antennas for communication in a second frequency band, and a second ground plane configured to provide a ground voltage to the second antennas, wherein the first ground plane and the second ground plane are electrically isolated from each other.

The antenna device may further include a first substrate in which the first antennas are disposed, and a second substrate in which the second antennas are disposed. The first substrate and the second substrate may be stacked.

The first ground plane may be disposed on one surface of the first substrate, and the second ground plane may be disposed on one surface of the second substrate.

Among the first antennas, one first antenna may be disposed to cross another first antenna. Among the second antennas, one second antenna may be disposed to cross another second antenna.

The first antennas may form a plurality of first antenna structures in which the first antennas are disposed to cross each other. The second antennas may form a plurality of second antenna structures in which the second antennas are disposed to cross each other. The second antenna structures may be disposed between the first antenna structures.

The first antennas may operate as a plurality of antenna ports for wireless fidelity (Wi-Fi) communication in the first frequency band. The second antennas may operate as a plurality of antenna ports for Wi-Fi communication in the second frequency band.

The first frequency band and the second frequency band may be different from each other.

According to another example embodiment, the antenna device may further include a substrate in which the first antennas and the second antennas are disposed. The first ground plane may be disposed on one surface of the substrate, and the second ground plane may be disposed on another surface of the substrate.

According to another example embodiment, the first antenna structure and the second antenna structure may be spaced apart from each other and may be disposed to overlap each other.

The second antenna structure may be disposed in a cavity located in a central portion of the first antenna structure.

DETAILED DESCRIPTION OF THE INVENTION

Figure 1:
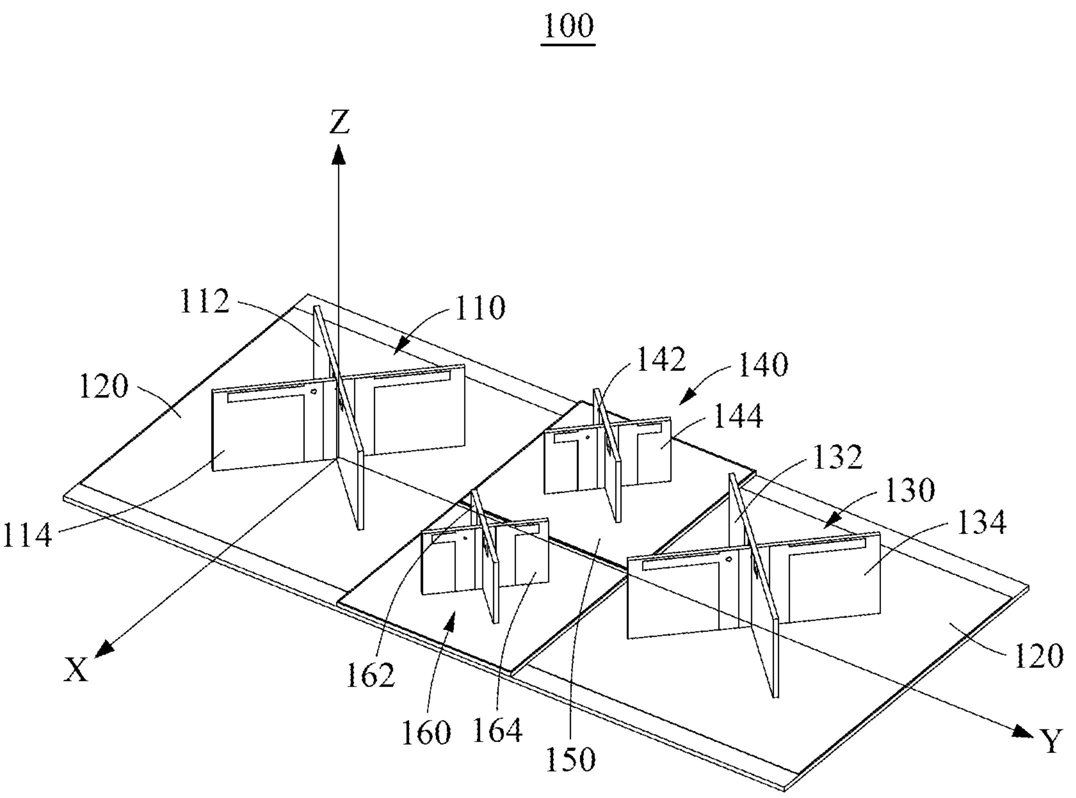
FIG. 1 illustrates an antenna device according to an example embodiment.

Hereinafter, example embodiments will be described in detail with reference to the accompanying drawings. Various modifications may be made to example embodiments. However, it should be understood that these embodiments are not construed as limited to the illustrated forms and include all changes, equivalents or alternatives within the idea and the technical scope of this disclosure.

The terminology used herein is for the purpose of description only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to example embodiments. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, description made in one example embodiment may be applicable to another example embodiment and detailed description within a duplicate range is omitted.

Figure 2:
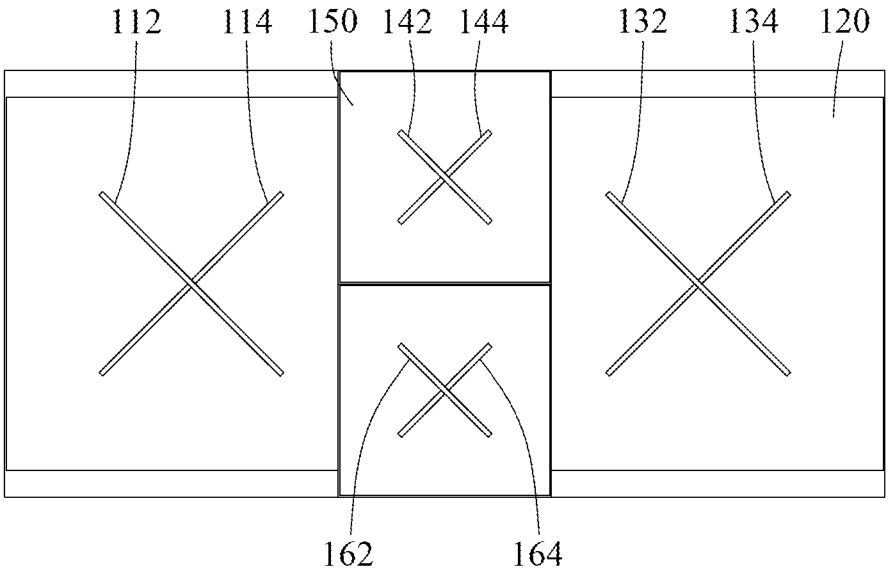
FIG. 2 is a plan view illustrating an antenna device according to an example embodiment as viewed in a Z-axis direction.
Figure 3:
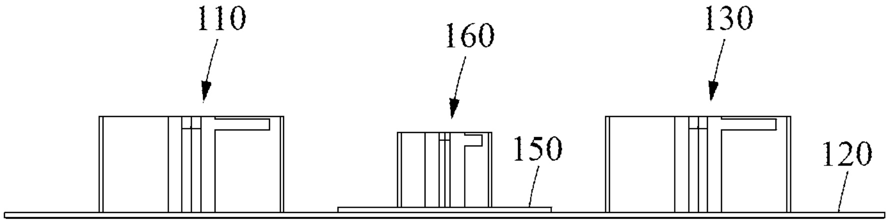
FIG. 3 is a front view illustrating an antenna device according to an example embodiment as viewed in an X-axis direction.
Figure 4:
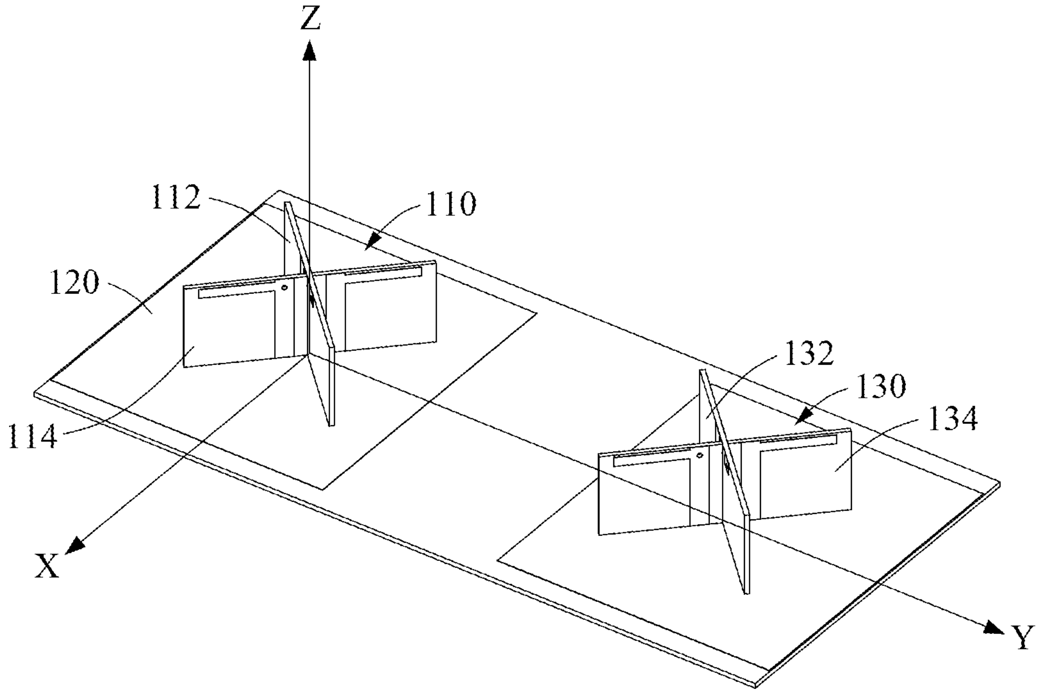
FIG. 4 illustrates first antenna structures included in an antenna device according to an example embodiment.
Figure 5:
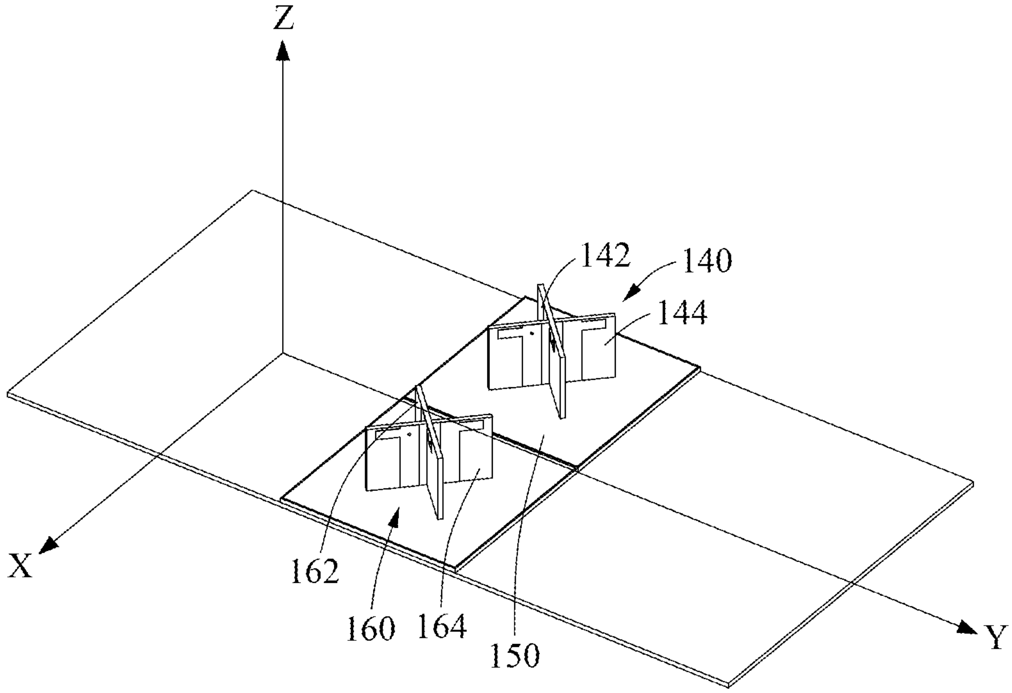
FIG. 5 illustrates second antenna structures included in an antenna device according to an example embodiment.

FIG. 1 illustrates an antenna device according to an example embodiment, FIG. 2 is a plan view illustrating an antenna device according to an example embodiment as viewed in a Z-axis direction, and FIG. 3 is a front view illustrating an antenna device according to an example embodiment as viewed in an X-axis direction. FIG. 4 illustrates first antenna structures included in an antenna device according to an example embodiment, and FIG. 5 illustrates second antenna structures included in an antenna device according to an example embodiment.

Referring to FIGS. 1 to 5, an antenna device 100 according to an example embodiment may be applicable to all types of electronic devices, for example, a mobile device, a computer, or a wearable device which may perform wireless communication, vehicles, and the like. The antenna device 100 may provide a function of a stacked dipole antenna that supports dual polarization. For example, the antenna device 100 may support dual polarization of a second-generation (2G) band and a fifth-generation (5G) band. However, this is merely an example, and the antenna device 100 may support dual polarization of various frequency bands. The antenna device 100 may be used as a multiple input multiple output (MIMO) antenna.

The antenna device 100 may include a plurality of first antennas 112, 114, 132, and 134 for communication in a first frequency band, and a plurality of second antennas 142, 144, 162, and 164 for communication in a second frequency band. In an example, the first antennas 112, 114, 132, and 134 may have the same shape as each other, and the second antennas 142, 144, 162, and 164 may also have the same shape as each other. The first antennas 112, 114, 132, and 134, and the second antennas 142, 144, 162, and 164 may have, for example, a shape of a planar radiator.

The first antennas 112, 114, 132, and 134 may operate as a plurality of antenna ports for wireless fidelity (Wi-Fi) communication in the first frequency band, and the second antennas 142, 144, 162, and 164 may operate as a plurality of antenna ports for Wi-Fi communication in the second frequency band. The first frequency band and the second frequency band may be different from each other, and may be, for example, a 2G band and a 5G band, respectively. However, example embodiments are not limited thereto, and each of the first frequency band and the second frequency band may also correspond to frequency bands other than the 2G band and the 5G band. For example, each of the first frequency band and the second frequency band may correspond to one of a millimeter (mm) wave band, a 6 gigahertz (GHz) band or less (for example, a 3 GHz band and a 4 GHz band), and a 7 GHz band such as a Wi-Fi 6E band. For convenience of description, an example in which the first frequency band is a 2G band and the second frequency band is a 5G band will be mainly described below, however, example embodiments are not limited to the 2G band and the 5G band.

Among the first antennas 112, 114, 132, and 134, one first antenna may be disposed to cross another first antenna. As shown in the drawing, the first antenna 112 may cross the first antenna 114, and the first antenna 132 may cross the first antenna 134. Based on the above arrangement, the first antennas 112, 114, 132, and 134 may form a plurality of first antenna structures 110 and 130 in which first antennas are disposed to cross each other. In a first antenna structure 110, the first antennas 112 and 114 may cross, and in a first antenna structure 130, the first antennas 132 and 134 may cross.

Among the second antennas 142, 144, 162, and 164, one second antenna may be disposed to cross another second antenna. As shown in the drawing, the second antenna 142 may cross the second antenna 144, and the second antenna 162 may cross the second antenna 164. Based on the above arrangement, the second antennas 142, 144, 162, and 164 may form a plurality of second antenna structures 140 and 160 in which second antennas are disposed to cross each other. In the second antenna structure 140, the second antennas 142 and 144 may cross each other, and in the second antenna structure 160, the second antennas 162 and 164 may cross each other. As shown in the drawing, the second antenna structures 140 and 160 may be arranged between the first antenna structures 110 and 130.

The antenna device 100 may include a first substrate 120 and a second substrate 150. The first antennas 112, 114, 132, and 134 may be disposed on the first substrate 120, and the second antennas 142, 144, 162, and 164 may be disposed on the second substrate 150. The first substrate 120 and the second substrate 150 may be stacked. For example, the second substrate 150 may be stacked on or above the first substrate 120. The first substrate 120 and the second substrate 150 may have, for example, a shape of a printed circuit board (PCB). A first ground plane may be disposed on one surface of the first substrate 120 to provide a ground voltage to the first antennas 112, 114, 132, and 134, and a second ground plane may be disposed on one surface of the second substrate 150 to provide a ground voltage to the second antennas 142, 144, 162, and 164. The first ground plane and the second ground plane may be electrically isolated from each other. In an example, the first ground plane may be formed on a bottom surface of the first substrate 120 for the first frequency band (for example, a 2G band), and the second ground plane may be formed on a top surface of the second substrate 150 for the second frequency band (for example, a 5G band). Based on the above structure, the first antennas 112, 114, 132, and 134 for the communication in the first frequency band, and the second antennas 142, 144, 162, and 164 for the communication in the second frequency band may not share the same ground, and a ground plane for the first antennas 112, 114, 132, and 134, and a ground plane for the second antennas 142, 144, 162, and 164 may be separately provided. Thus, a unique radiation characteristic of each of the first antennas 112, 114, 132, and 134 and the second antennas 142, 144, 162, and 164 may be maintained, and a mutual interference between different frequency bands may be minimized, to enhance isolation performance.

Through the above antenna arrangement structure, the antenna device 100 may minimize spatial restriction and enhance isolation performance, and performance of an antenna. For example, in implementing of a dual polarization stacked dipole antenna, a ground space may be minimized through the above antenna arrangement structure, and accordingly a space limitation for an antenna design may be reduced.

A ground plane may have a size suitable for each frequency band, and the antenna device 100 may be implemented in different sizes by distinguishing a ground plane for communication in the first frequency band from a ground plane for communication in the second frequency band through a structure of an antenna shown in the drawings. In addition, the second antenna structures 140 and 160 for the communication in the second frequency band may be arranged between the first antenna structures 110 and 130 for the communication in the first frequency band, and thus it is possible to reduce an antenna space required to implement dual polarization communication, thereby enabling miniaturization of the antenna device 100.

Figure 6:
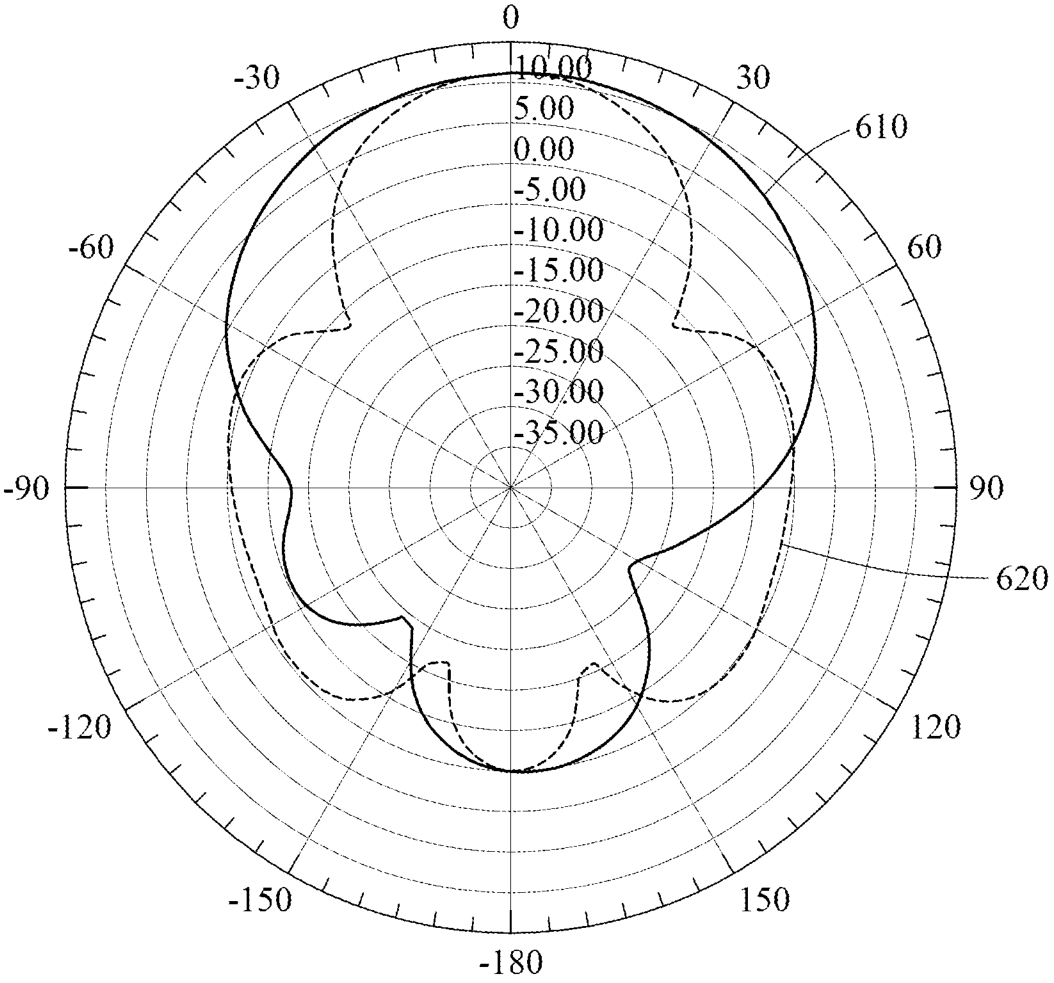
FIG. 6 illustrates E-plane radiation patterns of first antenna structures according to an example embodiment.

FIG. 6 illustrates E-plane radiation patterns of first antenna structures according to an example embodiment. FIG. 6 illustrates an example in which E-plane radiation patterns of the first antenna structures 110 and 130 of a MIMO type that perform Wi-Fi communication in the first frequency band (for example, a 2G band) in the antenna device 100 are synthesized. A radiation pattern 610 may represent a radiation pattern measured in a ZX plane (phi=0 degrees) at a frequency of 2.45 GHz, and a radiation pattern 620 may represent a radiation pattern measured in a ZY plane (phi=90 degrees) at the frequency of 2.45 GHz.

Figure 7:
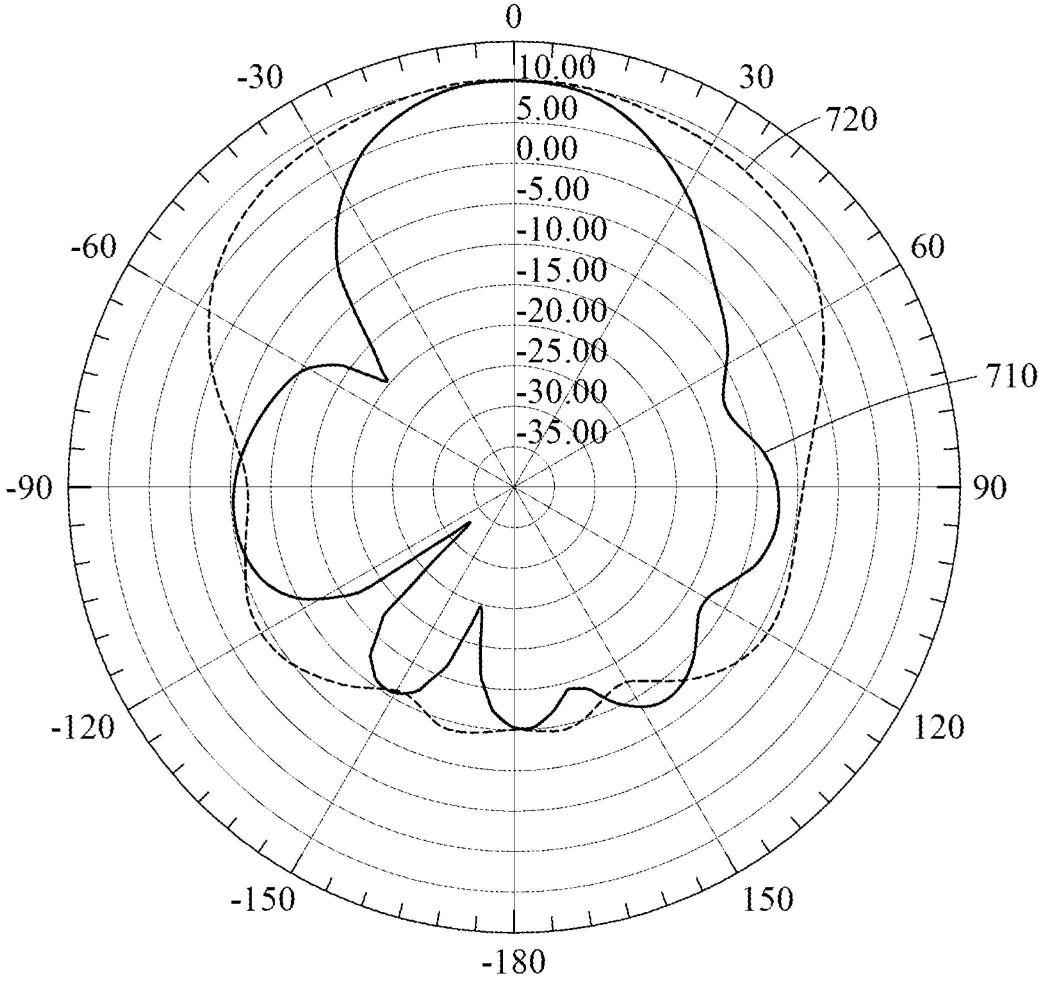
FIG. 7 illustrates E-plane radiation patterns of second antenna structures according to an example embodiment.

FIG. 7 illustrates E-plane radiation patterns of second antenna structures according to an example embodiment. FIG. 7 illustrates an example in which E-plane radiation patterns of the second antenna structures 140 and 160 of a MIMO type that perform Wi-Fi communication in the second frequency band (for example, a 5G band) in the antenna device 100 are synthesized. A radiation pattern 710 may represent a radiation pattern measured in the ZX plane (phi=0 degrees) at a frequency of 5.45 GHz, and a radiation pattern 720 may represent a radiation pattern measured in the ZY plane (phi=90 degrees) at the frequency of 5.45 GHz.

Referring to FIGS. 6 and 7, it may be found that the antenna device 100 may form a radiation pattern with excellent isolation performance for each of the first frequency band and the second frequency band.

Figure 8:
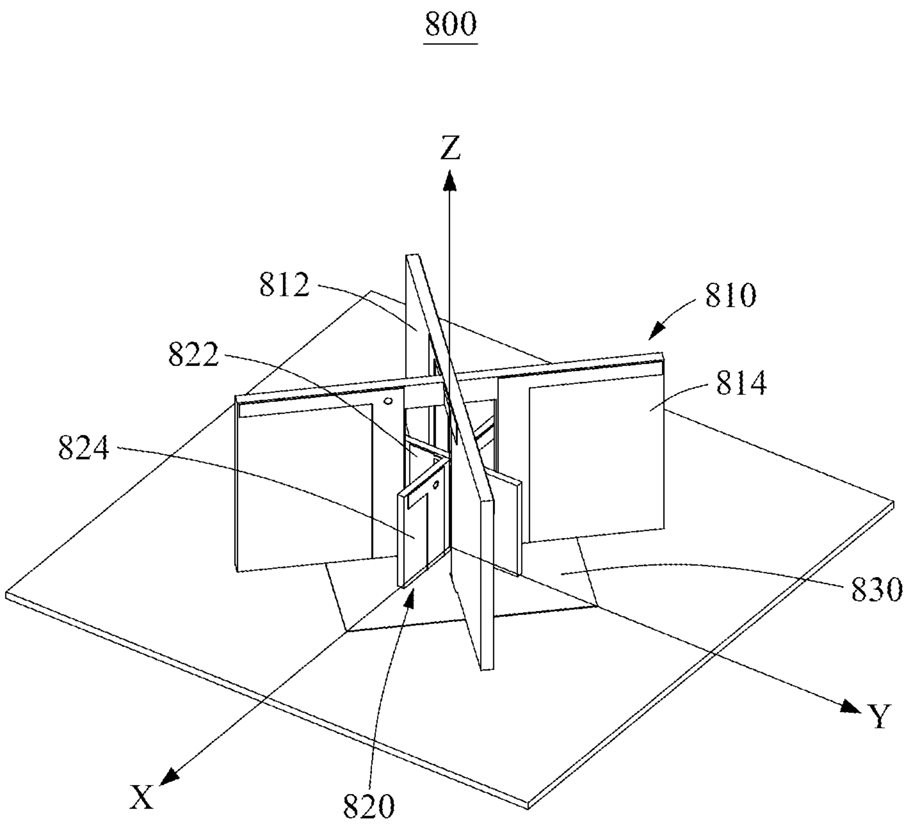
FIG. 8 illustrates an antenna device according to another example embodiment.
Figure 9:
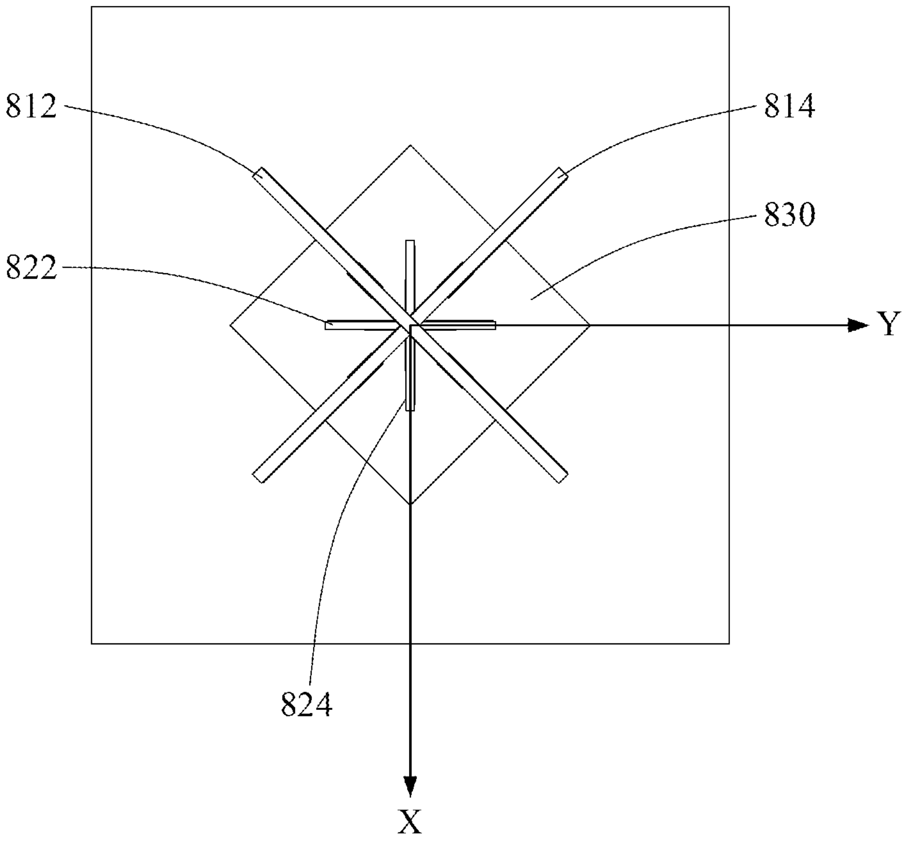
FIG. 9 is a plan view illustrating an antenna device according to another example embodiment as viewed in a Z-axis direction.
Figure 10:
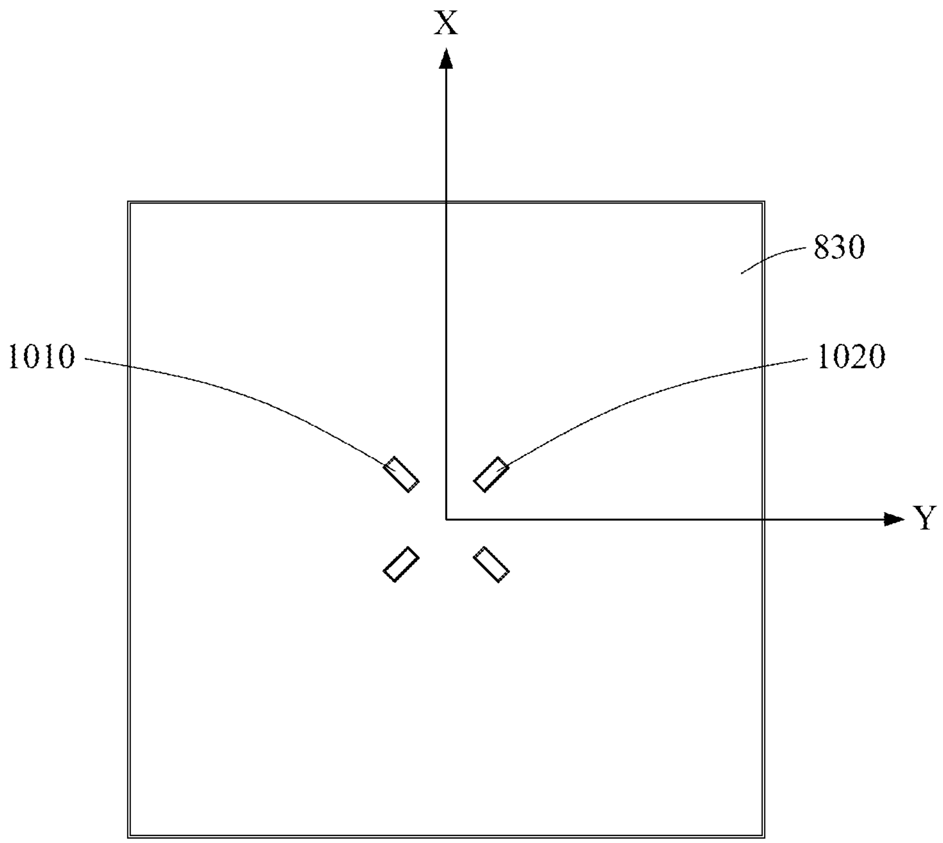
FIG. 10 is a bottom plan view illustrating an antenna device according to another example embodiment as viewed in the Z-axis direction.
Figure 11:
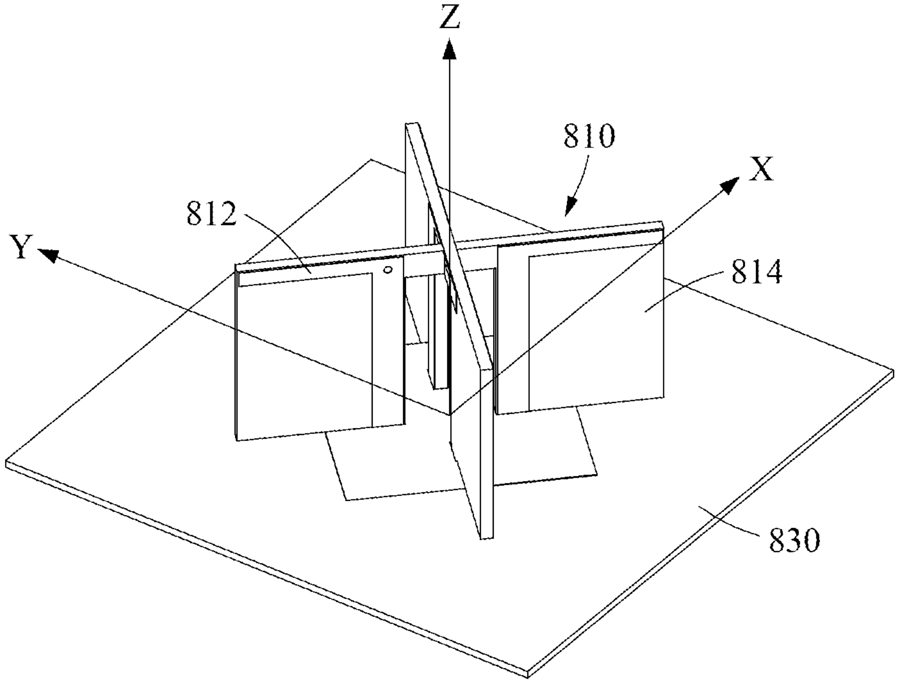
FIG. 11 illustrates first antenna structures included in an antenna device according to another example embodiment.
Figure 12:
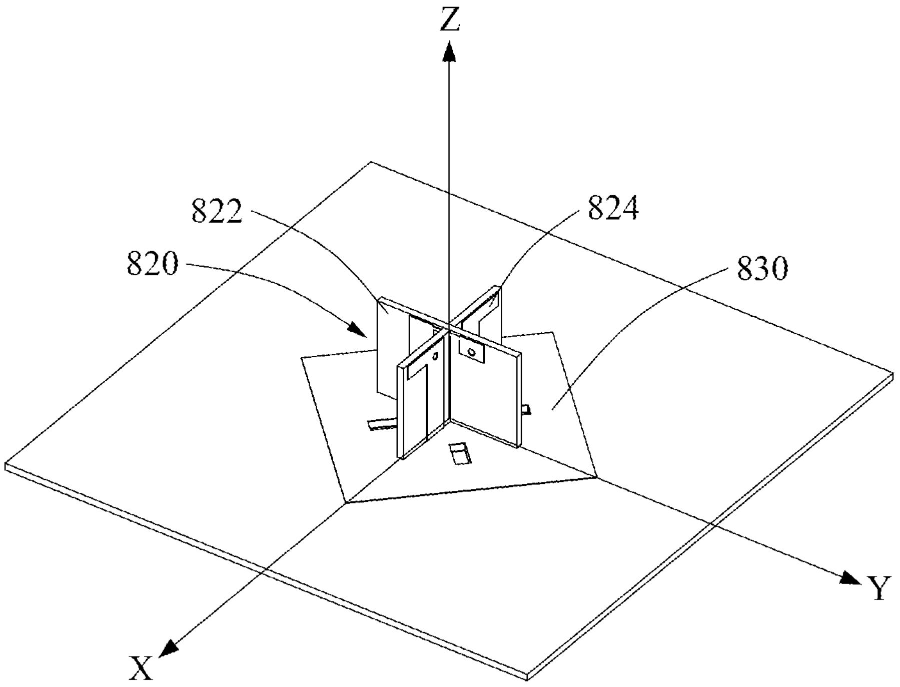
FIG. 12 illustrates second antenna structures included in an antenna device according to another example embodiment.

FIG. 8 illustrates an antenna device according to another example embodiment, FIG. 9 is a plan view illustrating an antenna device according to another example embodiment as viewed in a Z-axis direction, and FIG. 10 is a bottom plan view illustrating an antenna device according to another example embodiment as viewed in the Z-axis direction. FIG. 11 illustrates first antenna structures included in an antenna device according to another example embodiment, and FIG. 12 illustrates second antenna structures included in an antenna device according to another example embodiment.

Referring to FIGS. 8 to 12, an antenna device 800 according to another example embodiment may provide a function of a dipole antenna that supports dual polarization. For example, the antenna device 800 may support dual polarization of a 2G band and a 5G band.

The antenna device 800 may include a plurality of first antennas 812 and 814, and a plurality of second antennas 822 and 824 for communication in a second frequency band. In an example, the first antennas 812 and 814 may have the same shape as each other, and the second antennas 822 and 824 may also have the same shape as each other. The first antennas 812 and 814, and the second antennas 822 and 824 may have, for example, a shape of a planar radiator.

The first antennas 812 and 814 may operate as a plurality of antenna ports for Wi-Fi communication in the first frequency band, and the second antennas 822 and 824 may operate as a plurality of antenna ports for Wi-Fi communication in the second frequency band. The first frequency band and the second frequency band may be, for example, a 2G band and a 5G band, respectively, however, example embodiments are not limited thereto. Each of the first frequency band and the second frequency band may also correspond to frequency bands other than the 2G band and the 5G band.

The first antennas 812 and 814 may be disposed to cross each other, and the second antennas 822 and 824 may be disposed to cross each other. The first antennas 812 and 814 may form a first antenna structure 810 so that the first antennas 812 and 814 may cross each other in the first antenna structure 810, and the second antennas 822 and 824 may form a second antenna structure 820 so that the second antennas 822 and 824 may cross each other in the second antenna structure 820. The first antenna structure 810 and the second antenna structure 820 may be spaced apart from each other and may be disposed to overlap each other. When the antenna device 800 is viewed in the Z-axis direction, the first antenna structure 810 and the second antenna structure 820 may overlap each other and may not be connected to each other.

The antenna device 800 may include a substrate 830. The substrate 830 may be implemented in the form of a PCB. The first antennas 812 and 814 and the second antennas 822 and 824 may be disposed on the substrate 830. A first ground plane may be disposed on one surface of the substrate 830 to provide a ground voltage for the first antennas 812 and 814, and a second ground plane may be disposed on another surface of the substrate 830 to provide a ground voltage for the second antennas 822 and 824. For example, the first ground plane may be disposed on a bottom surface of the substrate 830, and the second ground plane may be disposed on a top surface of the substrate 830. Here, the first ground plane and the second ground plane may be electrically isolated from each other.

As described above, on one substrate 830 of the antenna device 800, the first antennas 812 and 814 for the communication in the first frequency band, and the second antennas 822 and 824 for the communication in the second frequency band may be arranged. Ground planes for communication in each frequency band may be disposed on different layers of the substrate 830, and may not be connected to each other, independently of each other. The antenna device 800 may support the communication in the first frequency band and the second frequency band using the one substrate 830, thereby minimizing a necessary space and size of the substrate 830 required to implement the antenna device 800.

A ground plane may have a size suitable for each frequency band, and the antenna device 800 may be implemented in different sizes by distinguishing a ground plane for communication in the first frequency band from a ground plane for communication in the second frequency band through an antenna structure shown in the drawings. In addition, the first antenna structure 810 for the communication in the first frequency band and the second antenna structure 820 for the communication in the second frequency band may be disposed to cross and may be designed to be stacked, and thus it is possible to minimize an antenna space required to implement dual polarization communication. The second antenna structure 820 may be disposed in a cavity located in a central portion of the first antenna structure 810, and planar radiators of the first antenna structure 810 and the second antenna structure 820 may be disposed to cross each other, and thus a spatial efficiency and isolation performance may be enhanced.

Figure 13:
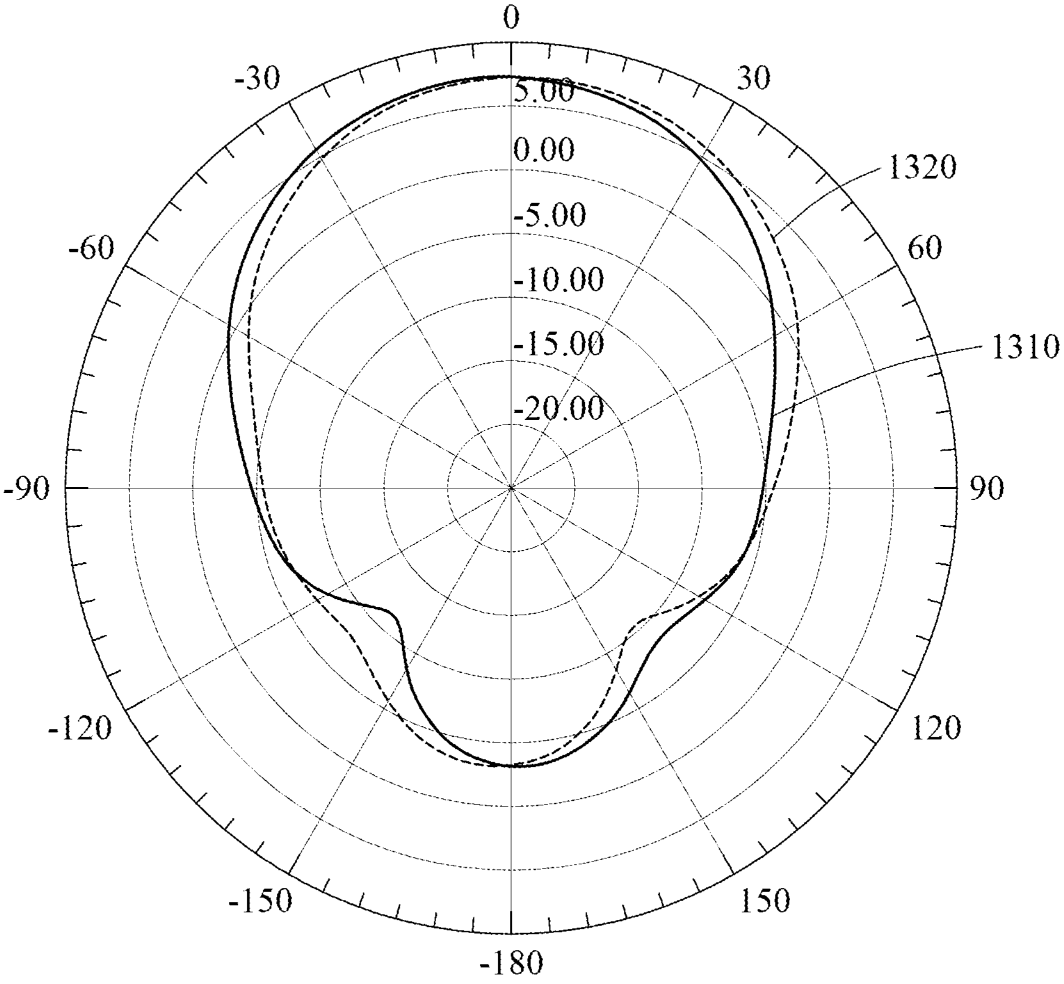
FIG. 13 illustrates an E-plane radiation pattern of a first antenna corresponding to a first port according to another example embodiment.

FIG. 13 illustrates an E-plane radiation pattern of a first antenna corresponding to a first port according to another example embodiment. FIG. 13 illustrates an E-plane radiation pattern of the first antenna 812 corresponding to a first port in the antenna device 800. A radiation pattern 1310 may represent a radiation pattern measured in a ZX plane (phi=0 degrees) at a frequency of 2.45 GHz, and a radiation pattern 1320 may represent a radiation pattern measured in a ZY plane (phi=90 degrees) at the frequency of 2.45 GHz.

Figure 14:
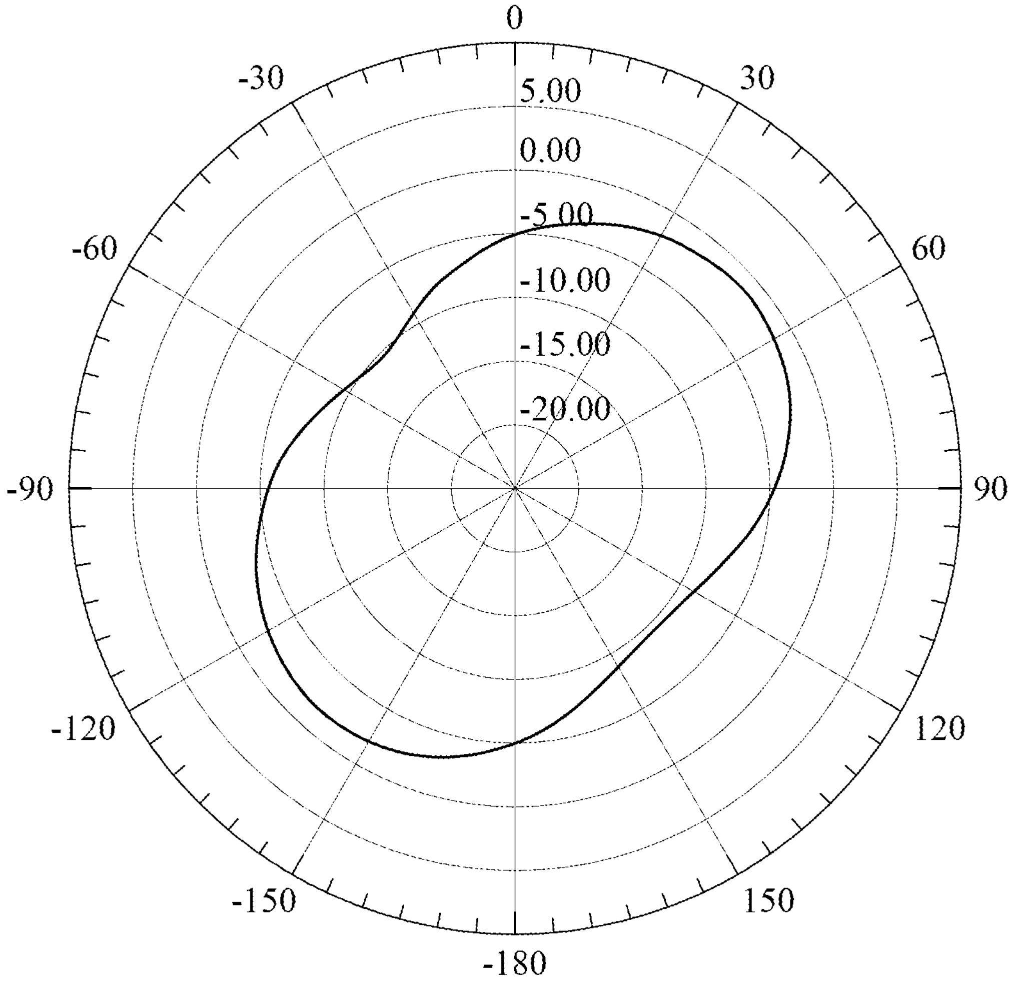
FIG. 14 illustrates an H-plane radiation pattern of a first antenna corresponding to a first port according to another example embodiment.

FIG. 14 illustrates an H-plane radiation pattern of a first antenna corresponding to a first port according to another example embodiment. FIG. 14 illustrates an H-plane radiation pattern of the first antenna 812 measured in an XY plane (theta=90 degrees) at the frequency of 2.45 GHz.

Figure 15:
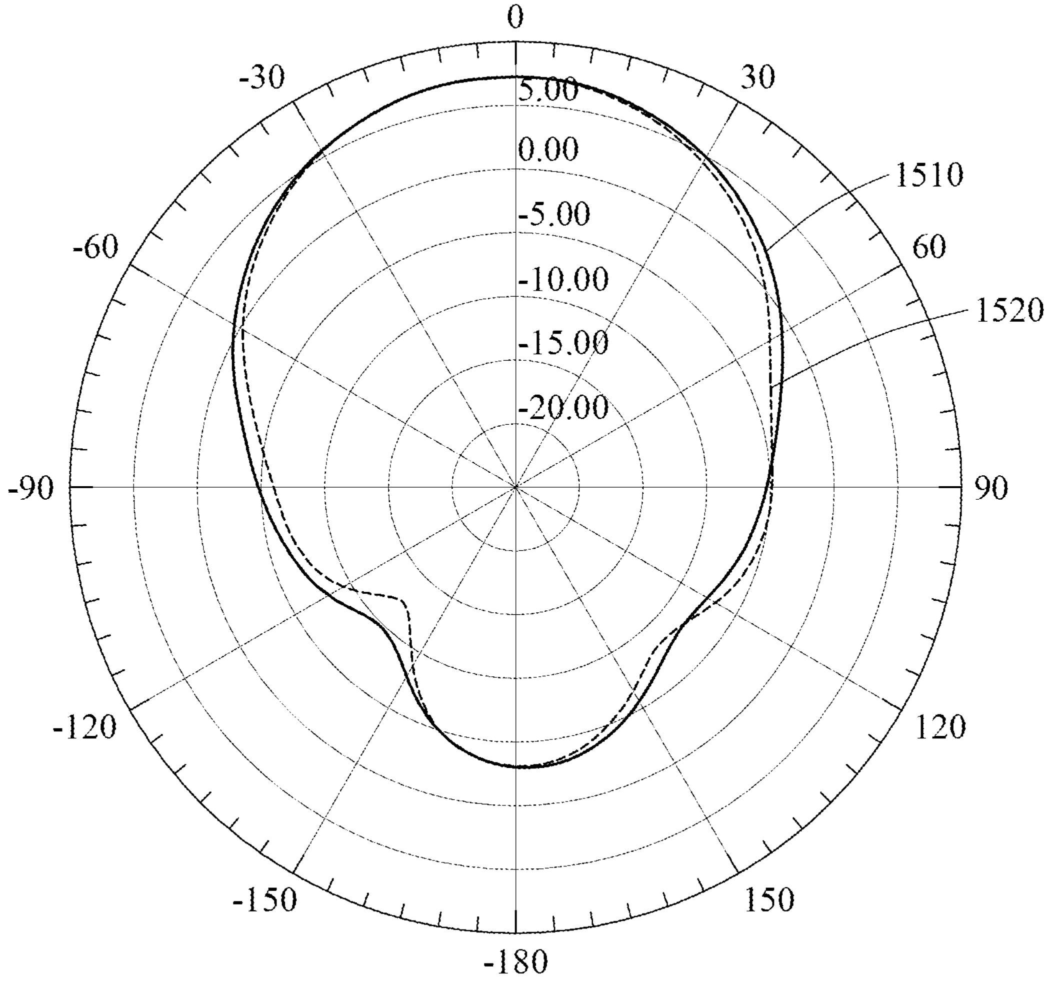
FIG. 15 illustrates an E-plane radiation pattern of a first antenna corresponding to a second port according to another example embodiment.

FIG. 15 illustrates an E-plane radiation pattern of a first antenna corresponding to a second port according to another example embodiment. FIG. 15 illustrates an E-plane radiation pattern of the first antenna 814 corresponding to a second port in the antenna device 800. A radiation pattern 1510 may represent a radiation pattern measured in the ZX plane (phi=0 degrees) at the frequency of 2.45 GHz, and a radiation pattern 1520 may represent a radiation pattern measured in the ZY plane (phi=90 degrees) at the frequency of 2.45 GHz.

Figure 16:
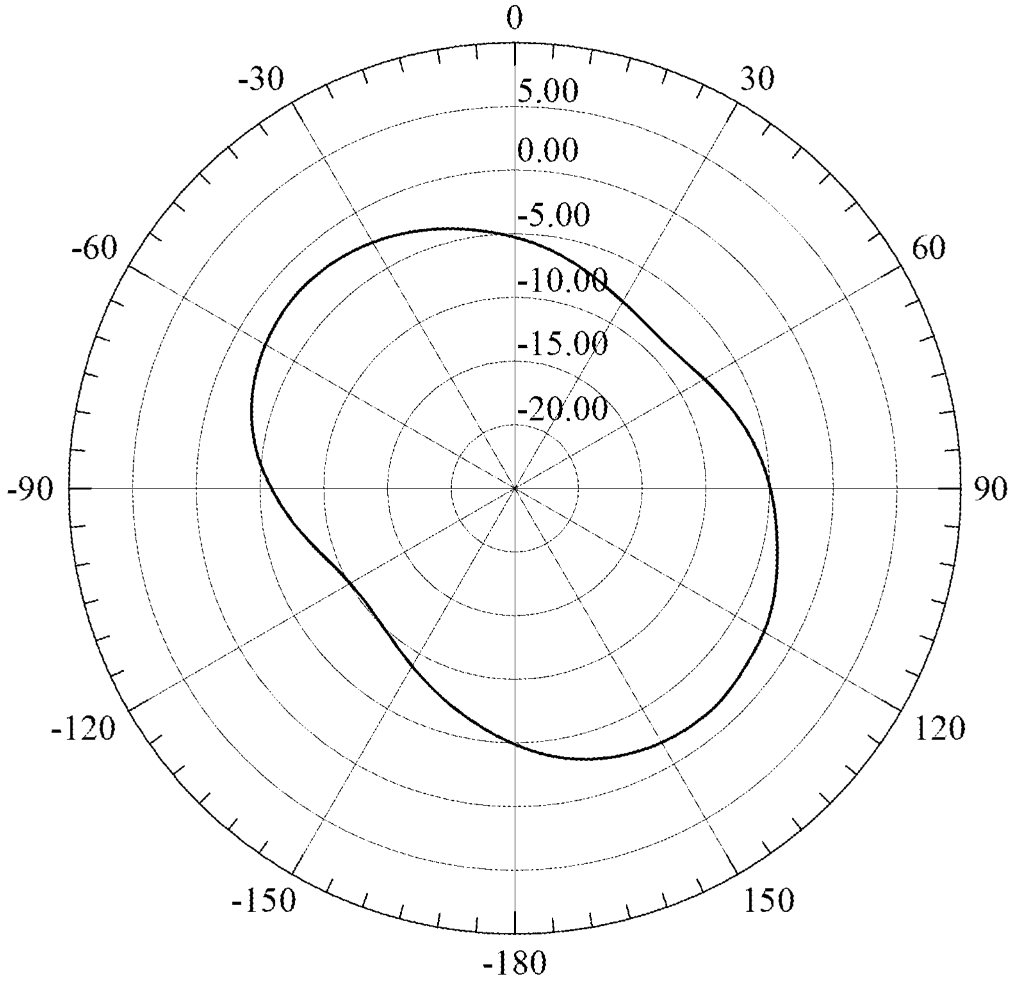
FIG. 16 illustrates an H-plane radiation pattern of a first antenna corresponding to a second port according to another example embodiment.

FIG. 16 illustrates an H-plane radiation pattern of a first antenna corresponding to a second port according to another example embodiment. FIG. 16 illustrates an H-plane radiation pattern of the first antenna 814 measured in the XY plane (theta=90 degrees) at the frequency of 2.45 GHz.

Figure 17:
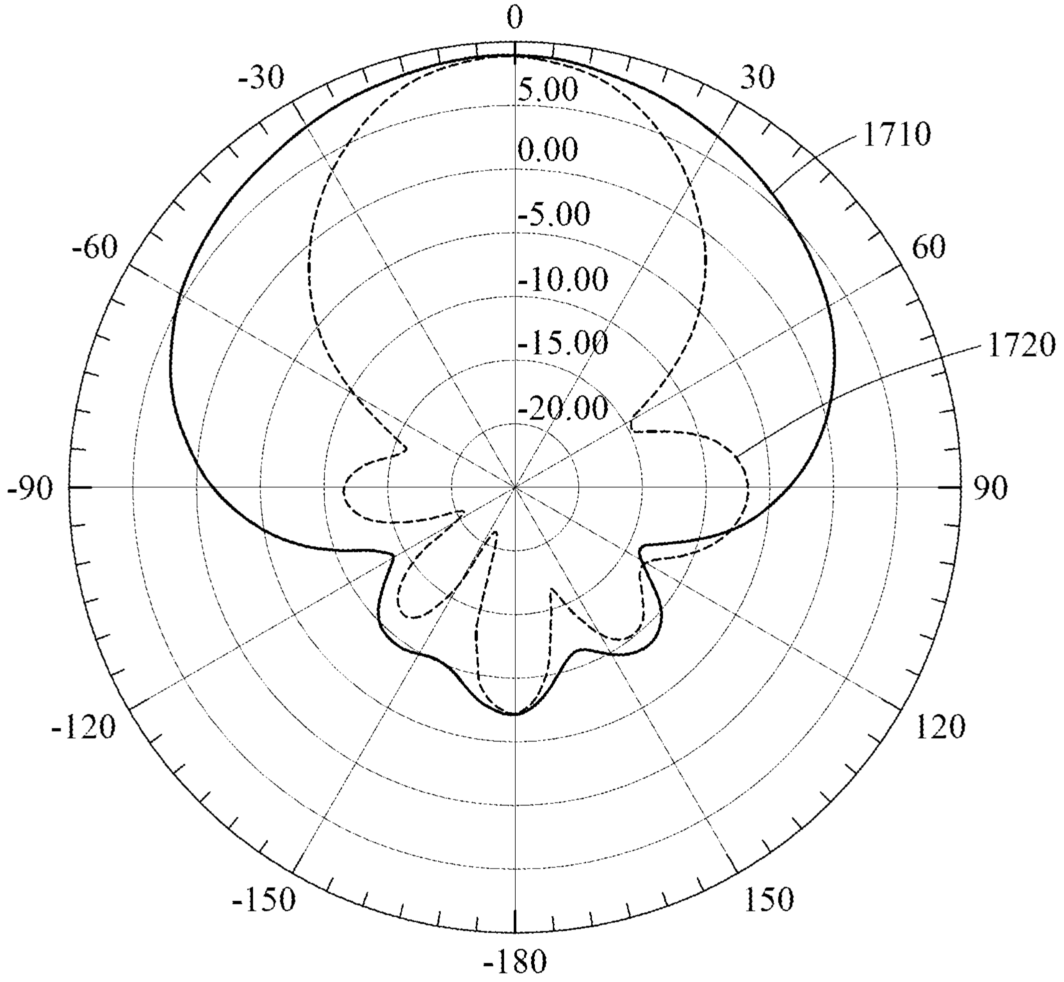
FIG. 17 illustrates an E-plane radiation pattern of a second antenna corresponding to a third port according to another example embodiment.

FIG. 17 illustrates an E-plane radiation pattern of a second antenna corresponding to a third port according to another example embodiment. FIG. 17 illustrates an E-plane radiation pattern of the second antenna 822 corresponding to a third port in the antenna device 800. A radiation pattern 1710 may represent a radiation pattern measured in the ZX plane (phi=0 degrees) at a frequency of 5.45 GHz, and a radiation pattern 1720 may represent a radiation pattern measured in the ZY plane (phi=90 degrees) at the frequency of 5.45 GHz.

Figure 18:
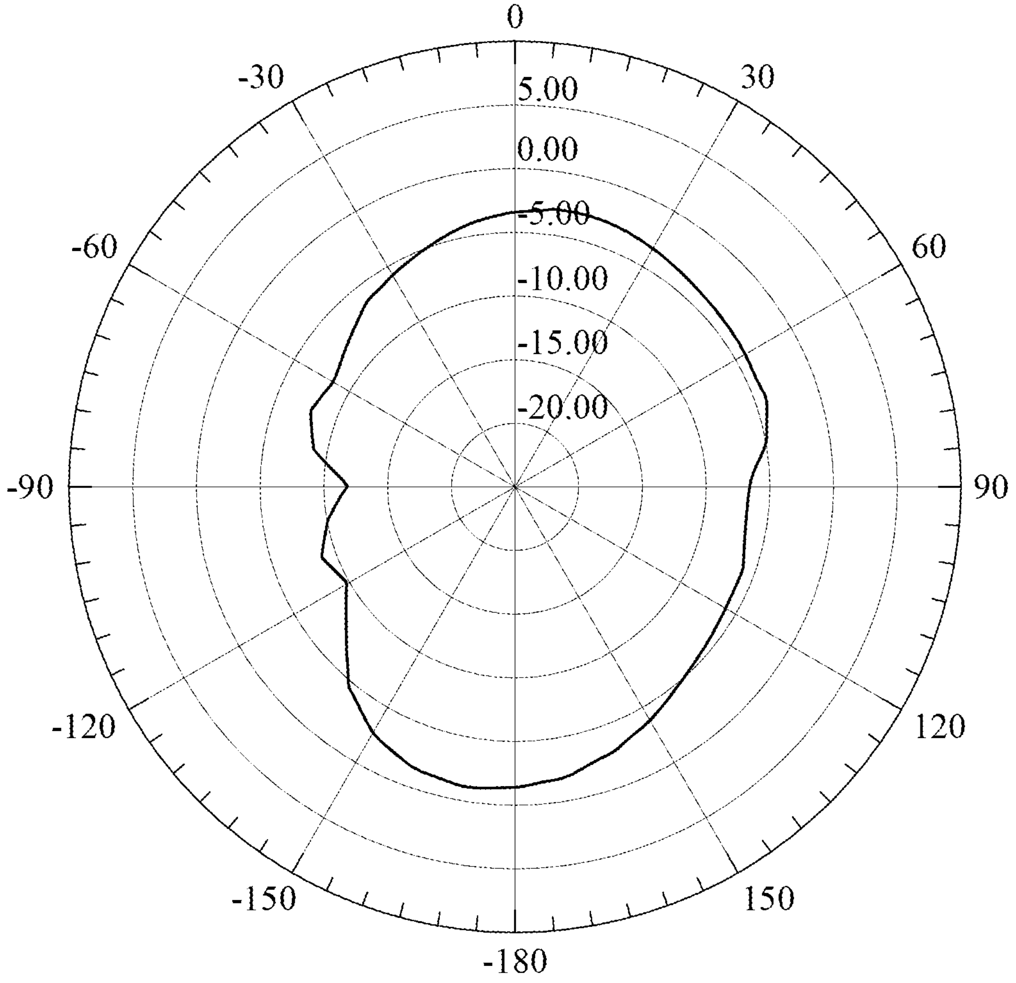
FIG. 18 illustrates an H-plane radiation pattern of a second antenna corresponding to a third port according to another example embodiment.

FIG. 18 illustrates an H-plane radiation pattern of a second antenna corresponding to a third port according to another example embodiment. FIG. 18 illustrates an H-plane radiation pattern of the second antenna 822 measured in the XY plane (theta=90 degrees) at the frequency of 5.45 GHz.

Figure 19:
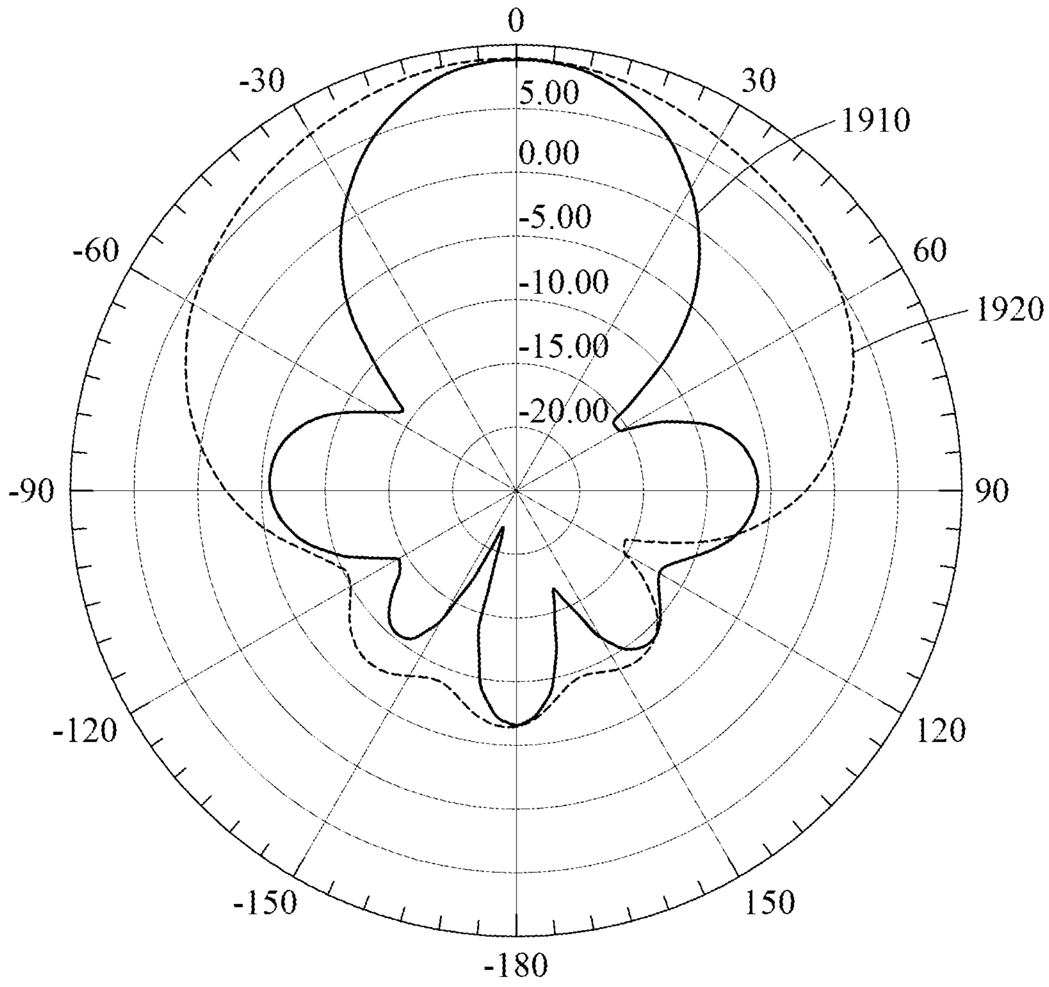
FIG. 19 illustrates an E-plane radiation pattern of a second antenna corresponding to a fourth port according to another example embodiment.

FIG. 19 illustrates an E-plane radiation pattern of a second antenna corresponding to a fourth port according to another example embodiment. FIG. 19 illustrates an E-plane radiation pattern of the second antenna 824 corresponding to a fourth port in the antenna device 800. A radiation pattern 1910 may represent a radiation pattern measured in the ZX plane (phi=0 degrees) at the frequency of 5.45 GHz, and a radiation pattern 1920 may represent a radiation pattern measured in the ZY plane (phi=90 degrees) at the frequency of 5.45 GHz.

Figure 20:
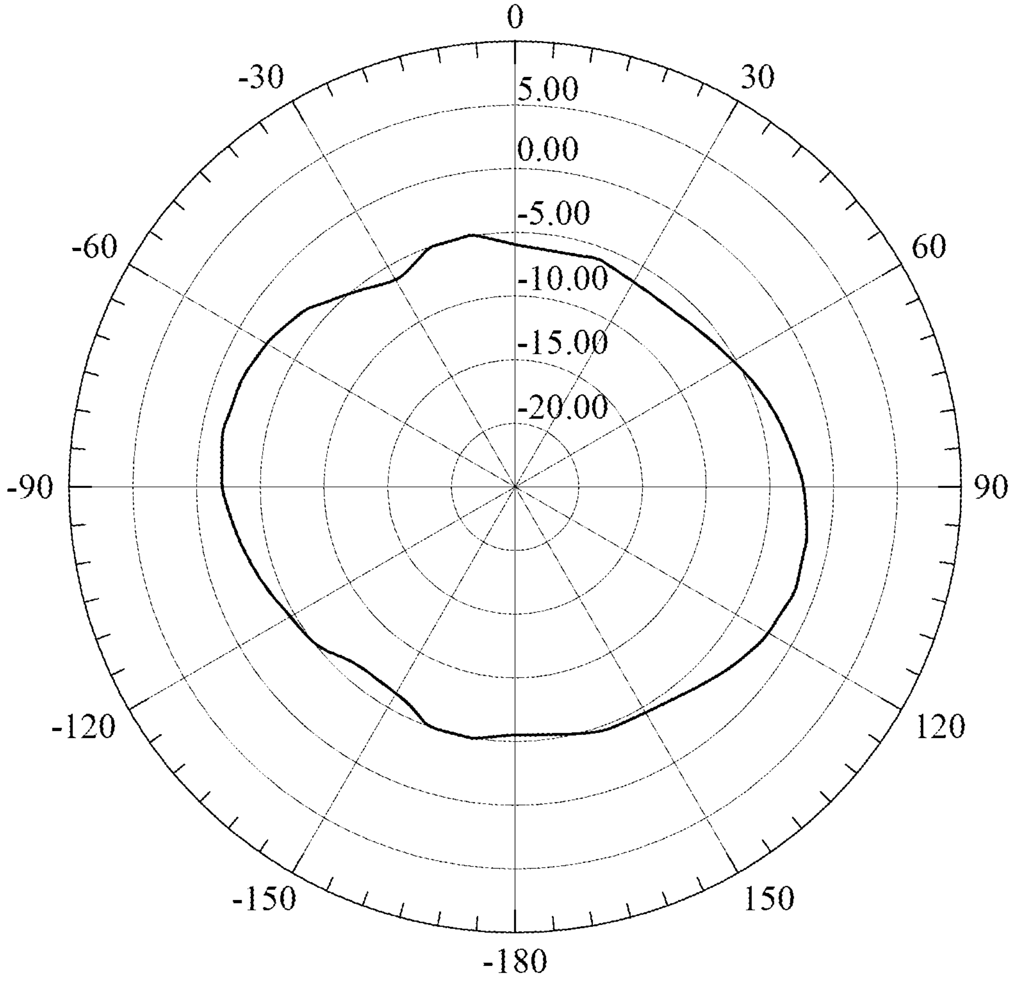
FIG. 20 illustrates an H-plane radiation pattern of a second antenna corresponding to a fourth port according to another example embodiment.

FIG. 20 illustrates an H-plane radiation pattern of a second antenna corresponding to a fourth port according to another example embodiment. FIG. 20 illustrates an H-plane radiation pattern of the second antenna 824 measured in the XY plane (theta=90 degrees) at the frequency of 5.45 GHz.

Referring to FIGS. 13 to 20, it may be found that the antenna device 800 may form a radiation pattern with excellent isolation performance for each of the first frequency band and the second frequency band.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An antenna device comprising:

a plurality of first antennas for communication in a first frequency band, wherein the first antennas form a first antenna structure in which the first antennas are disposed to cross each other, the first antenna structure having a cavity located in a central portion of the first antenna structure;

a first ground plane configured to provide a ground voltage to the first antennas;

a plurality of second antennas for communication in a second frequency band, the second antennas form a second antenna structure in which the second antennas are disposed to cross each other, wherein the first antenna structure and the second antenna structure are spaced apart from each other and are disposed to overlap each other, wherein the second antenna structure is disposed in the cavity located in the central portion of the first antenna structure; and a second ground plane configured to provide a ground voltage to the second antennas, wherein the first ground plane and the second ground plane are physically and electrically separated such that the first ground plane and the second ground plane are electrically isolated from each other;

wherein the first antennas are stacked above the first ground plane, wherein the second ground plane is stacked above the first ground plane, and wherein the second antennas are stacked above the first ground plane and the second ground plane.

2. The antenna device of claim 1, further comprising:

a first substrate in which the first antennas are disposed; and a second substrate in which the second antennas are disposed, wherein the first substrate and the second substrate are stacked.

3. The antenna device of claim 2, wherein the first ground plane is disposed on one surface of the first substrate, and the second ground plane is disposed on one surface of the second substrate.

4. The antenna device of claim 1, wherein among the first antennas, one first antenna is disposed to cross another first antenna, and among the second antennas, one second antenna is disposed to cross another second antenna.

5. The antenna device of claim 1, wherein the first antennas form a plurality of first antenna structures in which the first antennas are disposed to cross each other, the second antennas form a plurality of second antenna structures in which the second antennas are disposed to cross each other, and the second antenna structures are disposed between the first antenna structures.

6. The antenna device of claim 1, wherein the first antennas operate as a plurality of antenna ports for wireless fidelity (Wi-Fi) communication in the first frequency band, and the second antennas operate as a plurality of antenna ports for Wi-Fi communication in the second frequency band.

7. The antenna device of claim 1, wherein the first frequency band and the second frequency band are different from each other.

8. The antenna device of claim 1, further comprising:

a substrate in which the first antennas and the second antennas are disposed, wherein the first ground plane is disposed on one surface of the substrate, and the second ground plane is disposed on another surface of the substrate.

9. An antenna device comprising:

a plurality of first antennas for communication in a first frequency band, the first antennas form a first antenna structure in which the first antennas are disposed to cross each other;

a first ground plane configured to provide a ground voltage to the first antennas;

a plurality of second antennas for communication in a second frequency band, the second antennas form a second antenna structure in which the second antennas are disposed to cross each other;

a second ground plane configured to provide a ground voltage to the second antennas; and a substrate in which the first antennas and the second antennas are disposed, wherein the first ground plane is disposed on one surface of the substrate, and the second ground plane is disposed on another surface of the substrate;

wherein the first antenna structure and the second antenna structure are spaced apart from each other and are disposed to overlap each other, and wherein the second antenna structure is disposed in a cavity located in a central portion of the first antenna structure; and wherein the first ground plane and the second ground plane are electrically isolated from each other.

10. The antenna device of claim 9, wherein the first antennas operate as a plurality of antenna ports for wireless fidelity (Wi-Fi) communication in the first frequency band, and the second antennas operate as a plurality of antenna ports for Wi-Fi communication in the second frequency band.

11. The antenna device of claim 9, wherein the first frequency band and the second frequency band are different from each other.

* * * * *